(12) United States Patent  (10) Patent No.: US 8,511,188 B2
Caspers  (45) Date of Patent: Aug. 20, 2013

(54) LINEAR KINETIC ENERGY TO ROTATIONAL KINETIC ENERGY CONVERTER

(76) Inventor: Richard J. Caspers, Glenview, IL (US)

(*) Notice: Subject to any disclaimer, the term of this patent is extended or adjusted under 35 U.S.C. 154(b) by 475 days.

(21) Appl. No.: 12/828,341

(22) Filed: Jul. 1, 2010

(65) Prior Publication Data

US 2011/0000327 A1 Jan. 6, 2011

Related U.S. Application Data

(60) Provisional application No. 61/222,136, filed on Jul. 1, 2009.

(51) Int. Cl.
*F16H 29/00* (2006.01)

(52) U.S. Cl.
USPC .................. 74/126; 74/142; 280/253; 482/80

(58) Field of Classification Search
USPC ................ 74/126, 128, 129, 133, 134, 141.5, 74/142, 143; 280/221, 253, 255; 482/52, 482/80
See application file for complete search history.

(56) References Cited

U.S. PATENT DOCUMENTS

| | | | |
|---|---|---|---|
| 224,415 A | 2/1880 | French |
| 322,815 A | 7/1885 | Fleming |
| 369,860 A | 9/1887 | Kempster |
| 813,741 A | 2/1906 | Rudbeck |
| 3,760,905 A | 9/1973 | Dower |
| 4,282,442 A | 8/1981 | Massinger |
| 4,353,569 A | 10/1982 | Molina |
| 4,639,007 A | 1/1987 | Lawrence |
| 4,705,284 A | 11/1987 | Stout |
| 4,768,607 A | 9/1988 | Molina |
| 4,861,054 A | 8/1989 | Spital |
| 4,875,699 A | 10/1989 | Levavi |
| 4,928,986 A | 5/1990 | Carpenter |
| 4,976,451 A | 12/1990 | Kamenov |
| 5,280,936 A | 1/1994 | Schmidlin |
| 5,294,140 A | 3/1994 | Rinkewich |
| 5,690,346 A | 11/1997 | Keskitalo |
| 5,826,897 A | 10/1998 | Beard |
| 5,895,065 A | 4/1999 | Khomo |
| 6,007,083 A | 12/1999 | Currie |
| 6,217,398 B1 | 4/2001 | Davis |
| 6,378,882 B1 | 4/2002 | Devine |
| 6,932,370 B2 | 8/2005 | Jones et al. |
| 6,983,948 B2 | 1/2006 | Denison |
| 7,048,289 B2 | 5/2006 | Lau |

*Primary Examiner* — William C Joyce

(74) *Attorney, Agent, or Firm* — Boyle Fredrickson, S.C.

(57) ABSTRACT

An energy conversion system that converts linear kinetic energy to rotational kinetic energy is disclosed. A force is applied to a coil spring, compressing the spring. The spring drives an arm forward as the spring returns to its uncompressed state. The arm, in turn, causes the driving portion of an over-running clutch to rotate forward and drive an output shaft. The linear motion of the arm being driven forward by the spring is converted to rotational kinetic energy in the output shaft. The output shaft may then be connected to an external device to drive that device.

12 Claims, 14 Drawing Sheets

LINEAR KINETIC ENERGY TO ROTATIONAL KINETIC ENERGY CONVERTER

CROSS-REFERENCE TO RELATED APPLICATIONS

This application claims priority to U.S. provisional application Ser. No. 61/222,136, filed on Jul. 1, 2009, the entire contents of which is incorporated herein by reference.

BACKGROUND OF THE INVENTION

1. Field of the Invention

The subject matter disclosed herein relates to an energy conversion device. More specifically, the present invention relates to a system adapted to convert linear kinetic energy to rotational kinetic energy. Specifically, a preferred embodiment of the present invention converts linear kinetic energy applied by an operator to rotational kinetic energy to propel a vehicle.

2. Discussion of the Related Art

As is known to those skilled in the art, human-powered vehicles have been proposed that may be driven by forces applied from either a hand or a foot. Energy may be supplied from a user's hand, for example, by a rowing motion or by pressing and pulling a lever back-and-forth. Energy may similarly be supplied from a user's foot through a rotational, or pedaling, motion or by pressing and releasing a set of foot pedals.

Historically, it was known to harness the energy supplied by a user by coupling a drive mechanism from the input source to the mechanically driven member. For example, a bicycle typically includes pedals connected through a chain and a series of sprockets to a drive wheel. However, coupling the input from an operator directly to a drive wheel has various disadvantages. For example, the wheel may only remain turning while the operator turns the pedals. Optionally, a freewheeling mechanism may be included. However, power is only supplied to the drive wheel while the operator turns the pedals. Further, the rotational motion does not allow a human operator to utilize the legs in a "pressing" motion which is typically the strongest motion for a leg. A pressing motion in a leg causes the foot to extend and retract generally in line with the axis of an extended leg.

Therefore, an energy-conversion system which allows for more energy to be transferred to the output shaft in a more efficient and consistent manner would be desirable.

SUMMARY OF THE INVENTION

Consistent with the foregoing and in accordance with the subject matter as embodied and broadly described herein, a linear to rotational kinetic energy conversion system is described in suitable detail to enable one of ordinary skill in the art to make and use the invention.

An energy conversion system that converts linear kinetic energy to rotational kinetic energy is disclosed. A force is applied to a coil spring, compressing the spring. The spring drives an arm forward as the spring returns to its uncompressed state. The arm, in turn, causes the driving portion of an overrunning clutch to rotate forward and drive an output shaft. The linear motion of the arm being driven forward by the spring is converted to rotational kinetic energy in the output shaft. The output shaft may then be connected to an external device to drive that device.

According to one embodiment of the present invention, an energy conversion includes a frame and a spring compression system. The spring compression system includes a plate, a transfer bar, and a lever. The plate is operably mounted to the frame for receiving a generally linear force to move between a retracted position and an extended position. The transfer bar has a first end and a second end. The first end of the transfer bar is connected to the plate and movable between the retracted position and the extended position. The lever is pivotally mounted to the frame and has a first end and a second end. The first end of the lever is connected to the second end of the transfer bar. The energy conversion system also includes a push arm having a first end and a second end. The first end of the push arm is engaged by the second end of the lever. A coil spring having a first end and a second end is also included. The first end of the coil spring is engaged by the push arm, wherein the coil spring is compressed by the lever engaging the push arm when the plate is in the extended position. A transfer member includes a first portion with an opening extending therethrough and a second portion extending away from the first portion. The second end of the push arm engages the second portion of the transfer member. An over-running clutch has a driving portion and a driven portion, and the opening on the transfer member engages the driving portion. An output shaft is connected to the driven portion of the over-running clutch, wherein the over-running clutch engages the output shaft when the transfer member rotates faster than the output shaft and the clutch disengages the output shaft when the transfer member rotates slower than the output shaft.

According to another embodiment of the invention, an energy conversion system for converting linear kinetic energy into rotational kinetic energy includes a frame and a spring compression system. The spring compression system includes a plate, a transfer bar and a lever. The plate is operably mounted to the frame for receiving a generally linear force to move between a retracted position and an extended position. The transfer bar has a first end and a second end, the first end of the transfer bar connected to the plate and movable between the retracted position and the extended position. The lever is pivotally mounted to the frame and has a first end and a second end. The first end of the lever is connected to the second end of the transfer bar. The energy conversion system also includes a coil spring having a first end and a second end. The second end of the coil spring is rigidly connected to the frame. A compression plate has a first surface mounted to the first end of the coil spring, and is engaged by the second end of the lever to apply a compressing force against the coil spring when the plate travels from the retracted to the extended position. A push arm has a first end and a second end. The first end of the push arm is connected to the compression plate. A drive bar has a first end and a second end. The first end of the drive bar is pivotally connected to the frame and has a plurality of holes extending from the first end of the drive bar along a portion of the length of the drive bar. The second end of the push arm is selectively connected to one of the holes. A linkage is connected proximate the second end of the drive bar and has a channel formed along one side of the linkage. A return bar has a first end and a second end, and the second end slidably engages the channel in the linkage. A transfer member includes a first portion with an opening extending therethrough and a second portion extending away from the first portion, and the second portion of the transfer member is connected to the first end of the return bar. An over-running clutch has a driving portion and a driven portion, wherein the opening on the transfer member engages the driving portion. An output shaft is connected to the driven portion of the over-running clutch, wherein the over-running clutch engages the output shaft when the transfer member rotates faster than the output shaft and the clutch disengages the output shaft when the transfer member rotates slower than the output shaft.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Preferred exemplary embodiments of the subject matter disclosed herein are illustrated in the accompanying drawings in which like reference numerals represent like parts throughout, and in which.

Figure 1:
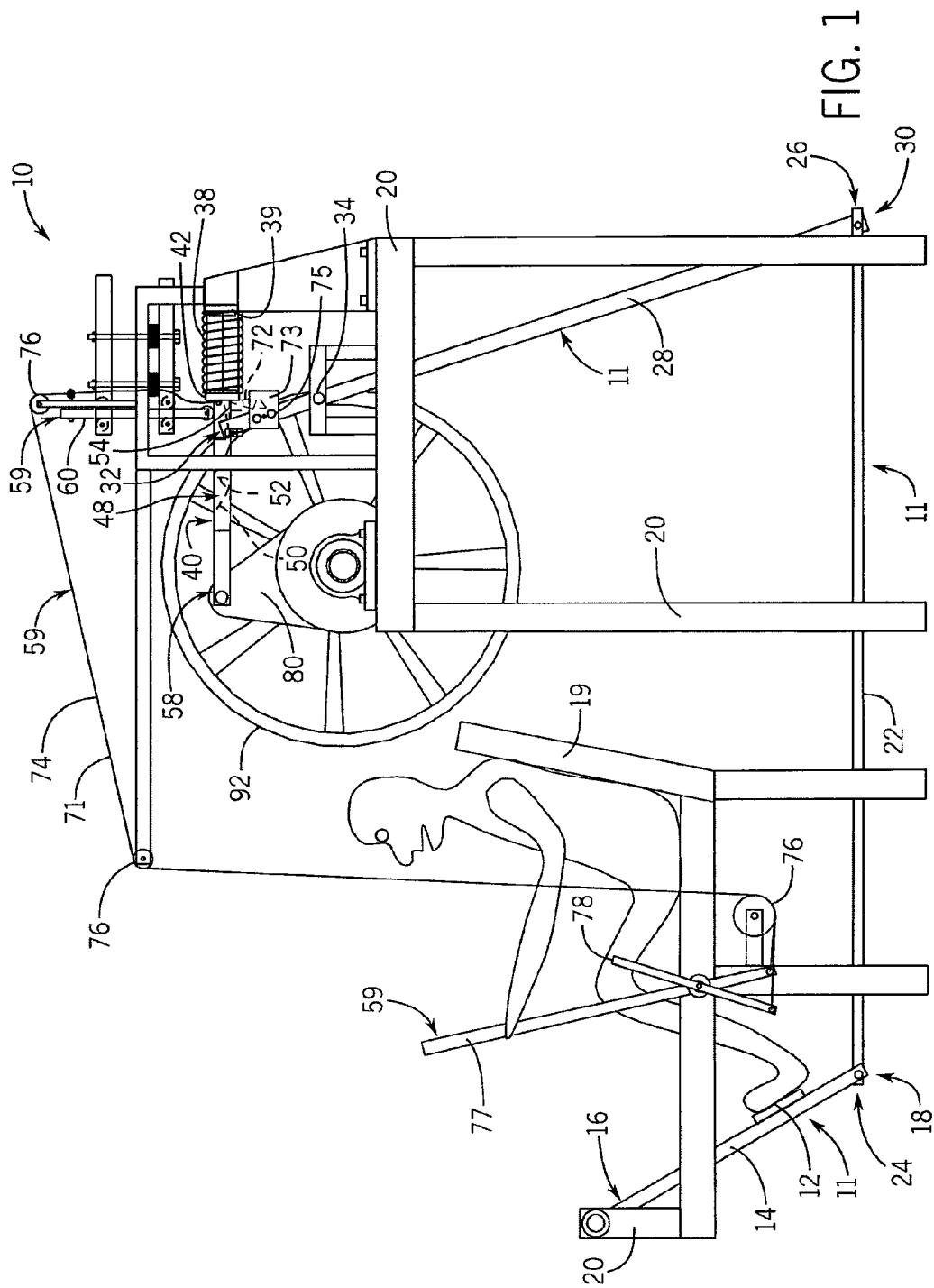
FIG. 1 is a side view of one embodiment of the energy conversion system.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DESCRIPTION OF THE PREFERRED EMBODIMENTS

The present invention and the various features and advantageous details thereof are explained more fully with reference to the non-limiting embodiments described in detail in the following description.

1. System Overview

In basic form, an energy conversion system that converts linear kinetic energy to rotational kinetic energy is disclosed. The energy conversion system receives energy applied by an operator at a plate, or pedals, and sequentially transfers the energy as kinetic and potential energy, engaging a drive member, and, optionally, causing rotation of a flywheel. A force is applied to a coil spring by a spring compression system. In one embodiment, the spring compression system includes a plate against which an operator may apply a force, for example by pressing against the plate with a foot. The force applied to the plate causes the plate to travel in a generally linear motion. A transfer bar connected to the plate similarly travels in a generally linear motion and transfers the force applied at the plate to one end of a lever, the lever being attached to the opposite end of the transfer bar. The lever in turn engages a push arm which applies the force to compress a coil spring.

The push arm is used to control the compression of the spring. The push arm is positioned between the coil spring at one end and a transfer member on the other end. The lever engages the push arm such that the push arm causes the spring to compress. A spring holding member then engages the push arm to prevent the push arm from returning to its original position, keeping the spring compressed. The spring compression system is then released, allowing the lever to return to its original position such that it clears the travel of the spring. A cable on the holding member may be pulled to release the spring holding member from the push arm. Once the holding member has cleared the push arm, the coil spring returns to its uncompressed state, applying a force to the push arm and returning the push arm to its original position.

The motion of the push arm returning to its original position is used to drive the output shaft. As the coil spring forces the push arm back to its original state, the push arm may be directly connected to a transfer member on the other side, causing the transfer member to rotate about an output shaft. Optionally, the push arm may be coupled to the transfer member through a pair of bars acting as a lever on the transfer member. The transfer member is connected to the driving portion of an overrunning clutch. The force applied by the coil spring through the push arm and transfer member causes the over-running clutch to begin turning and to rotate the output shaft. The output shaft may then be used to drive an external device. Thus, the linear energy applied to the spring compression system is transferred to a rotating output shaft. Optionally, a flywheel may be attached to the output shaft to provide storage of the rotational energy.

In one embodiment of the present invention, the energy of the rotating output shaft is used to propel a vehicle. The energy conversion system may be integrated into a standard chassis, for example a roll-bar dune buggy chassis. The human-propelled vehicle may serve as a replacement vehicle, for example for short commutes to work, school, and shopping, or as exercise equipment. Optionally, the rotational energy in the output shaft may be used for other applications, such as turning a pump, operating a log-splitter, driving an electrical generator, or other such applications configured to utilize the rotational energy.

2. Detailed Description of Preferred Embodiments

Specific embodiments of the present invention will now be further described by the following, non-limiting examples which will serve to illustrate various features of significance. The examples are intended to merely facilitate an understanding of ways in which the present invention may be practiced and to further enable those of skill in the art to practice the present invention. Accordingly, the examples should not be construed as limiting the scope of the present invention.

As previously discussed, the present invention converts linear kinetic energy to rotational energy. Any means known to one skilled in the art may be used to apply the linear kinetic energy, preferably by transferring a force from a human operator. Any device adaptable to be driven by the rotational energy may be connected to the invention. A preferred embodiment of the present invention, propelling a land vehicle, is illustrated in the figures and discussed in detail in the following description.

Figure 2:
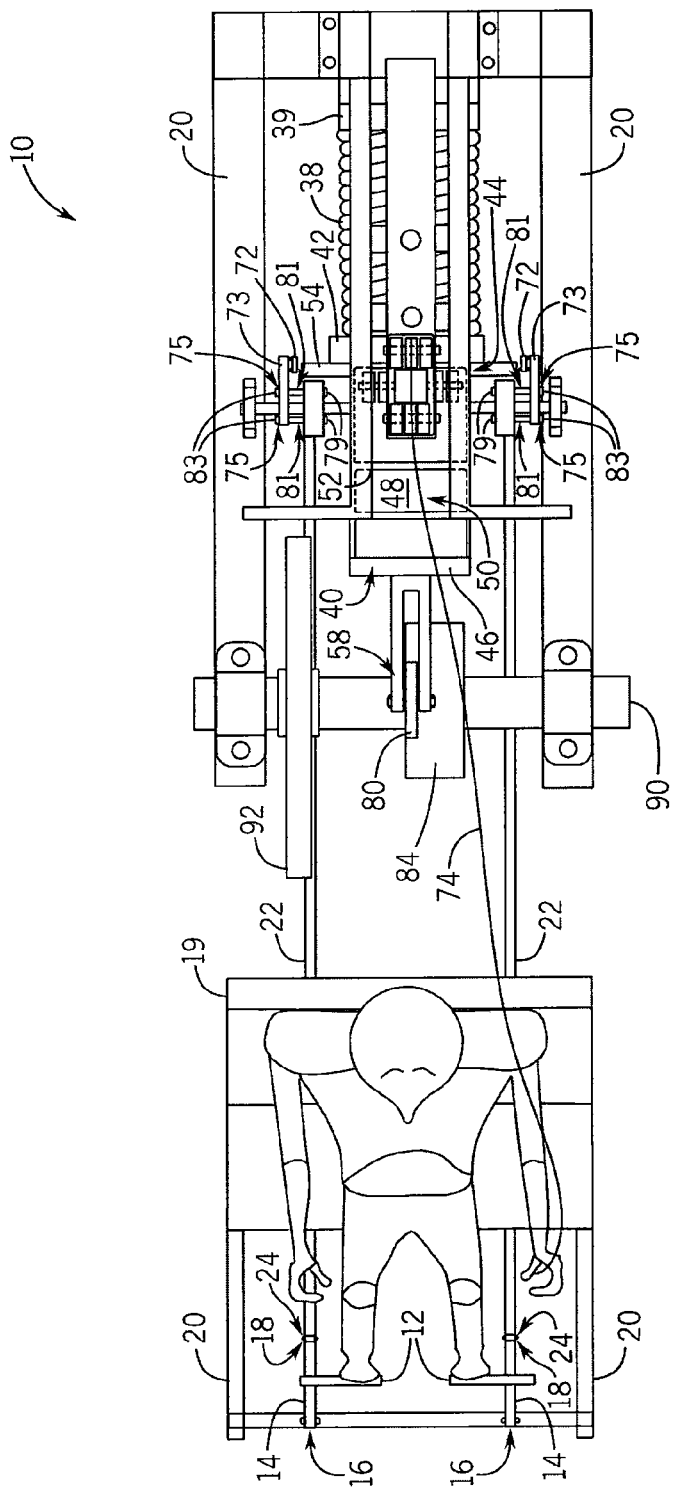
FIG. 2 is a top view of the energy conversion system of FIG. 1.
Figure 3:
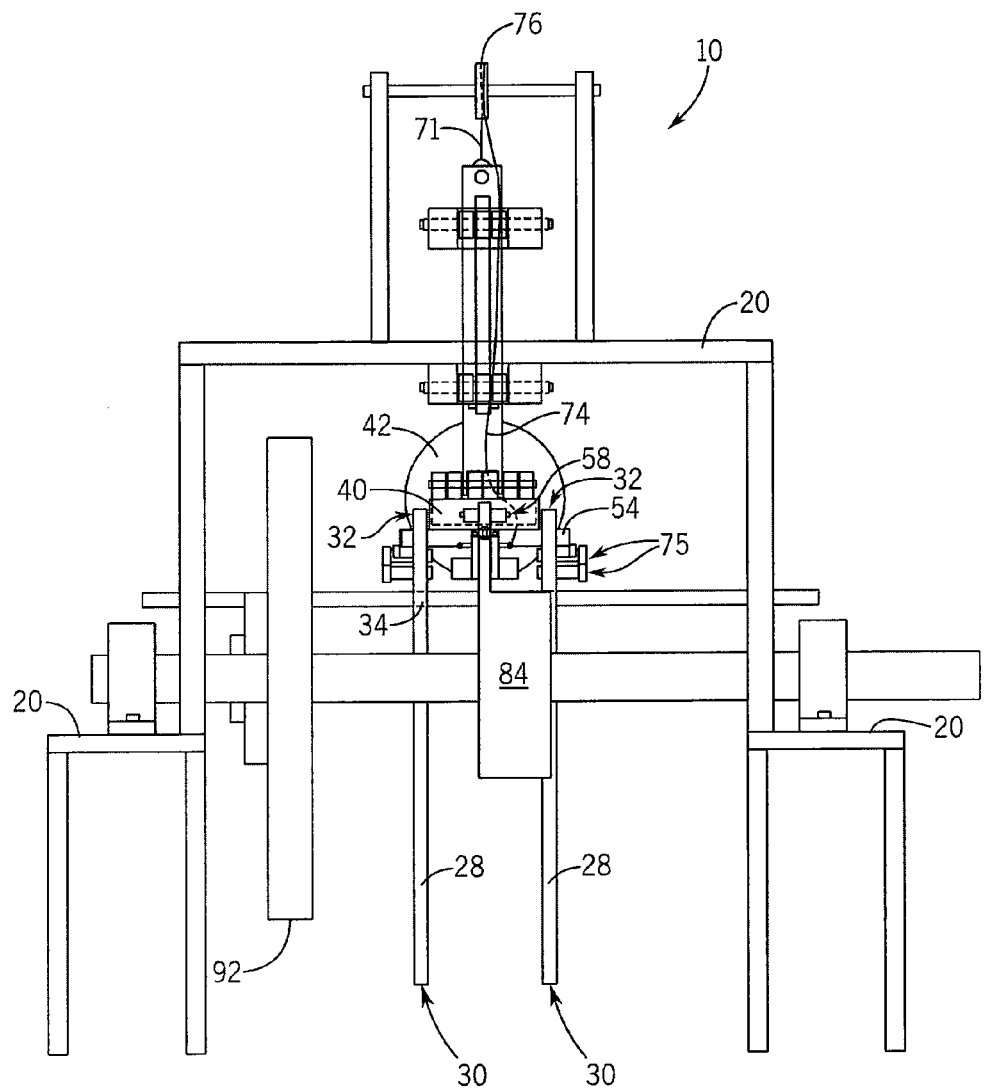
FIG. 3 is a front view of the energy conversion system of FIG. 1.
Figure 4:
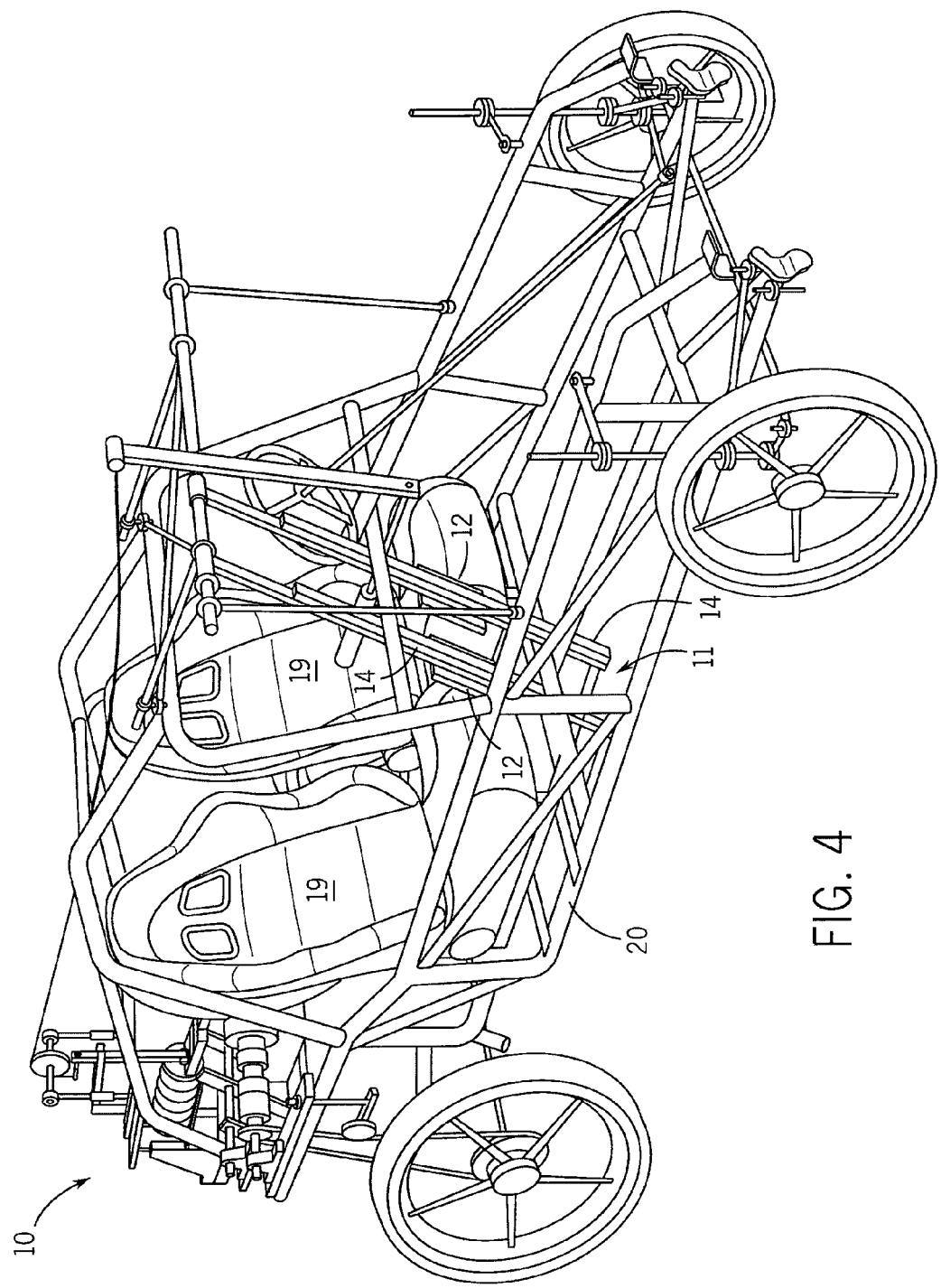
FIG. 4 is an isometric view of another embodiment of the energy conversion system implemented in a human-powered vehicle.
Figure 5:
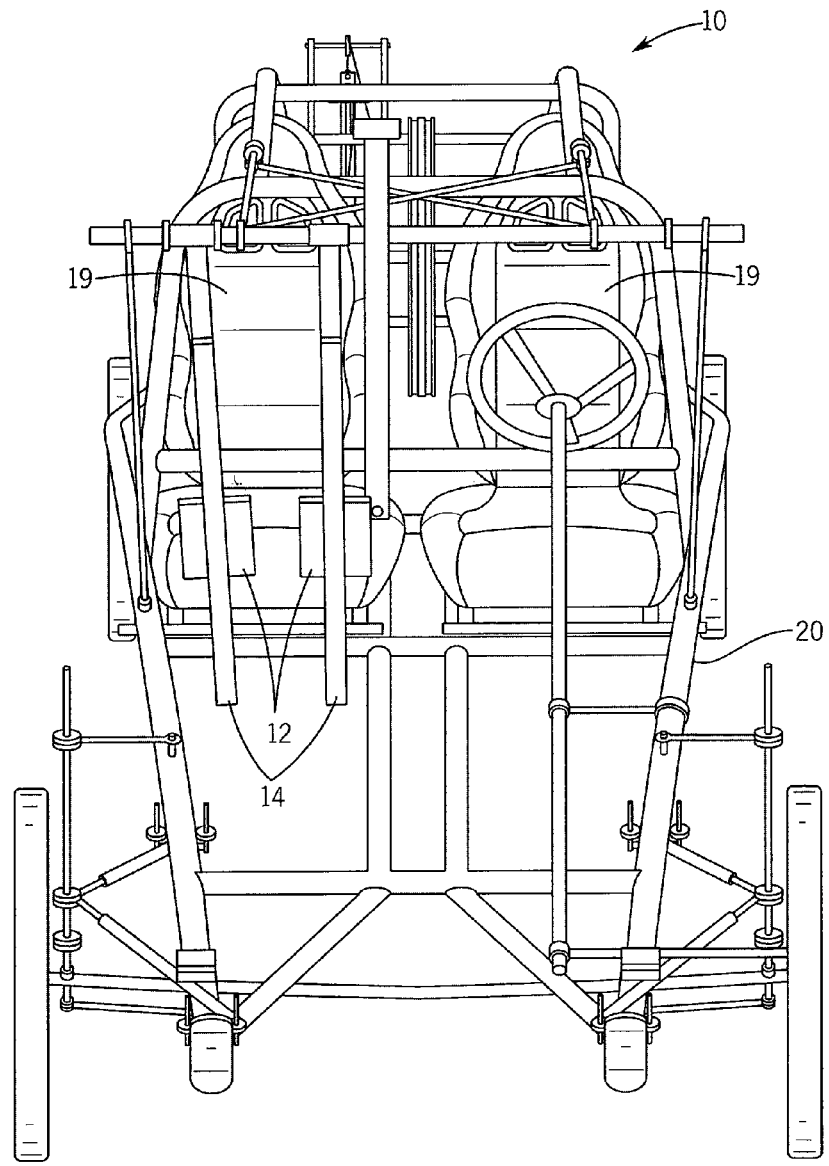
FIG. 5 is a front view of the energy conversion system as implemented in FIG. 4.
Figure 6:
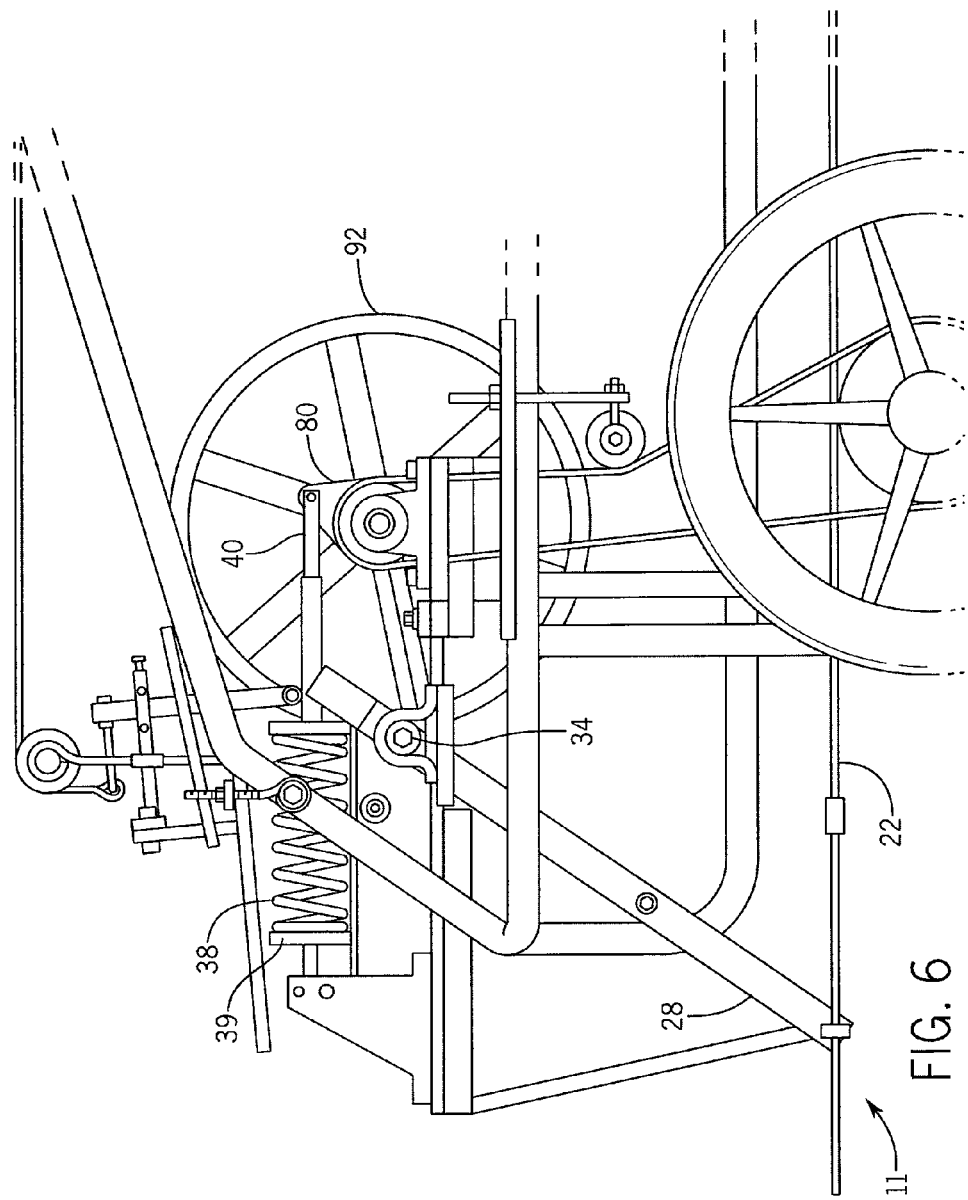
FIG. 6 is a partial right side view of the energy conversion system of FIG. 4.
Figure 7:
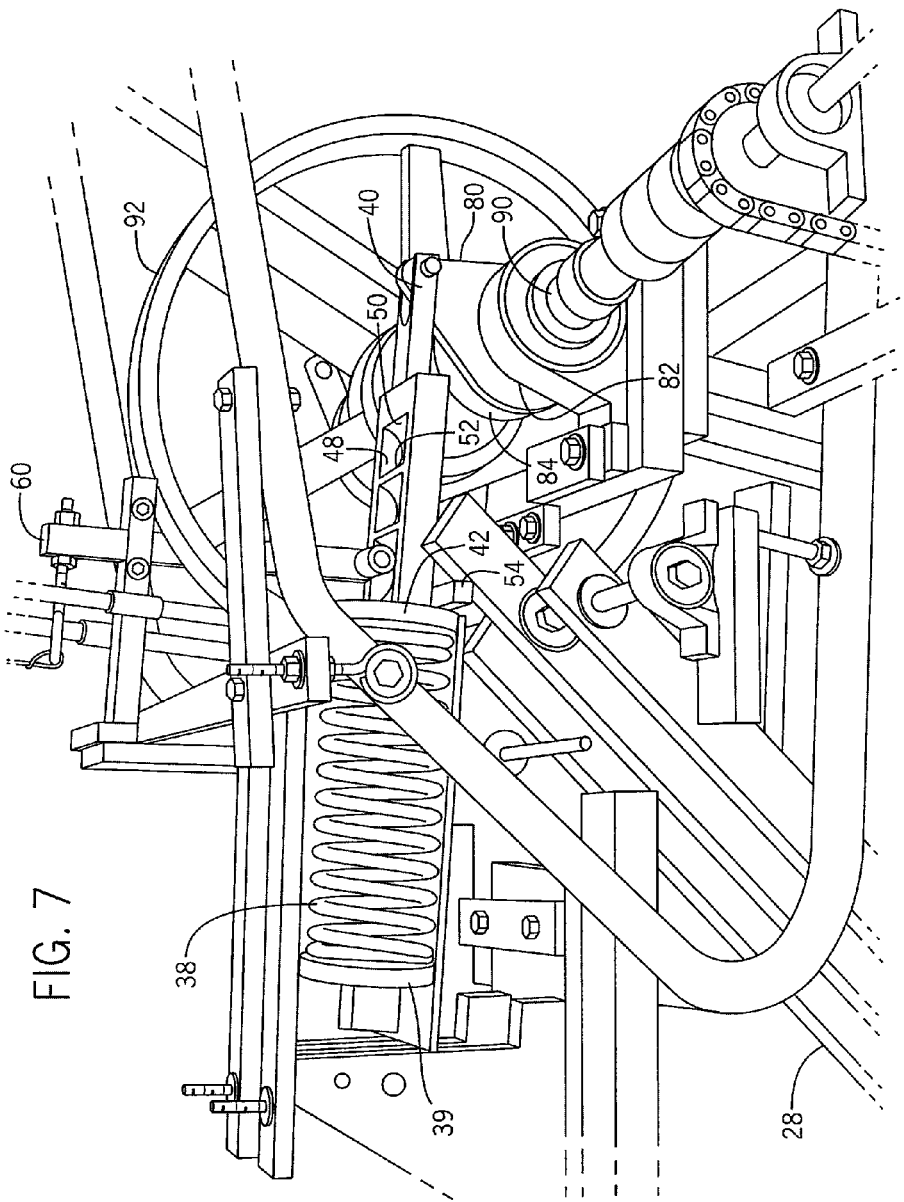
FIG. 7 is a partial perspective view of the energy conversion system of FIG. 4.

Turning initially to FIGS. 1-3, one embodiment of a linear to rotational kinetic energy conversion system 10 is illustrated. FIGS. 4-10, illustrate a first embodiment of the linear to rotational kinetic energy conversion system 10 incorporated into a human-powered vehicle. The energy conversion system 10 includes a spring compression system 11. The spring compression system 11 preferably includes a plate 12, a support bar 14, a transfer bar 22, and a lever 28. The plate 12 is connected to the support bar 14. The support bar 14 is pivotally connected to a frame 20 at a first end 16. The second end 18 of the support bar 14 is pivotally connected to a first end 24 of a transfer bar 22. The second end 26 of the transfer bar 22 is pivotally connected to a first end 30 of a lever 28. The lever 28 rotates about the fulcrum 34 such that the second end 32 of the lever 28 engages a push arm 40.

At least one, and preferably a pair, of spring compression systems 11 are used in each energy conversion system 10 to input linear kinetic energy to the energy conversion system 10. An operator is positioned to apply a force to each plate 12, for example by pressing against each plate 12 with a foot. It is contemplated that each plate 12 may be pressed either together or in an alternating fashion. Additionally, multiple seats 19 and multiple spring compression systems 11 may be provided such that multiple operators may provide energy to the energy conversion system 10. Each operator may be seated on a seat 19 attached to the frame 20. Each transfer bar 22 extends under the seat 19 to connect to a lever 28. It is contemplated that each lever 28 may engage separate push arms 40 or, optionally, a pair of levers 28 controlled by a single operator may both engage one push arm 40.

Figure 11:
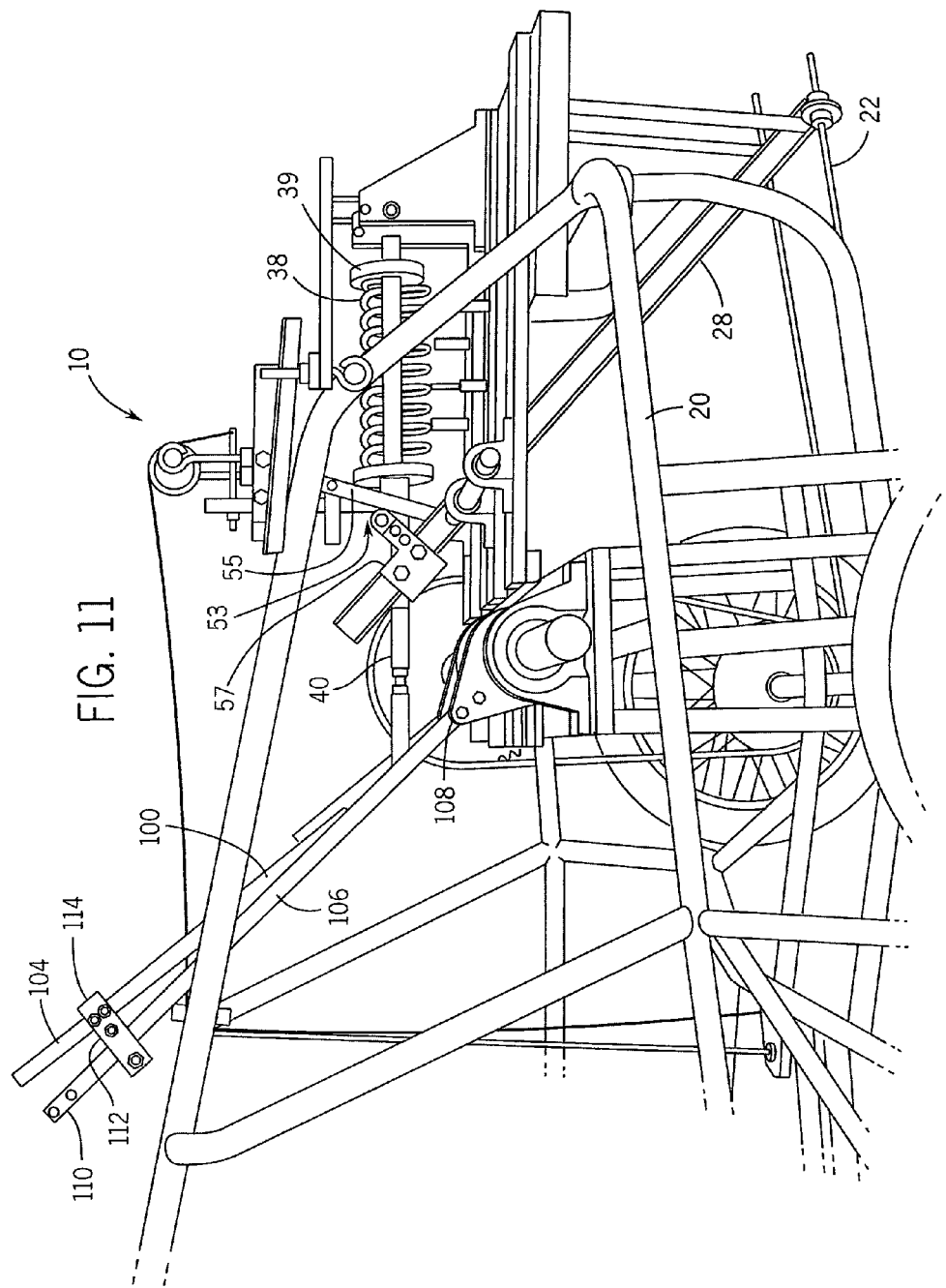
FIG. 11 is a partial perspective view of another embodiment of the energy conversion system implemented in a human-powered vehicle
Figure 12:
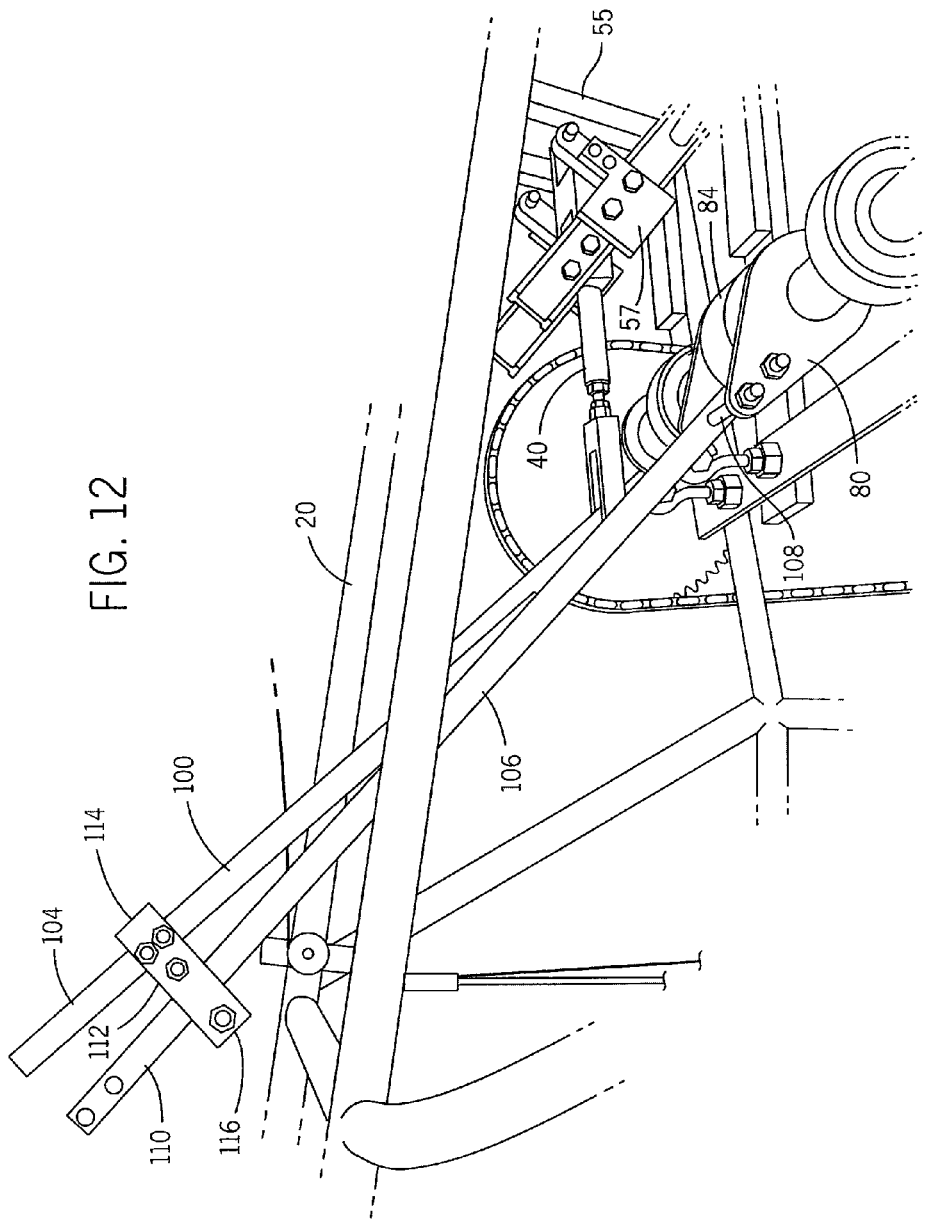
FIG. 12 is a partial perspective view of the energy conversion system of FIG. 11.
Figure 13:
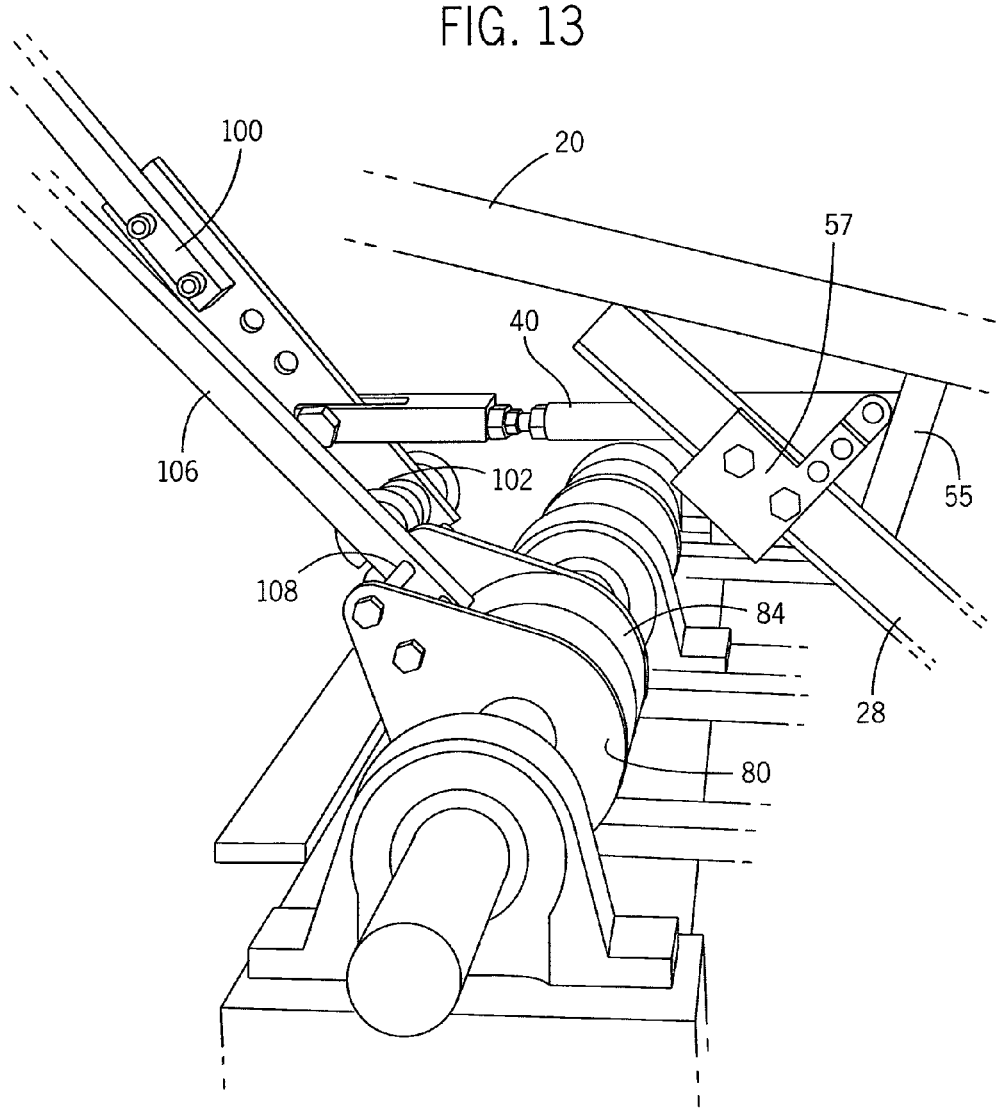
FIG. 13 is a partial perspective view of the energy conversion system of FIG. 11.
Figure 14:
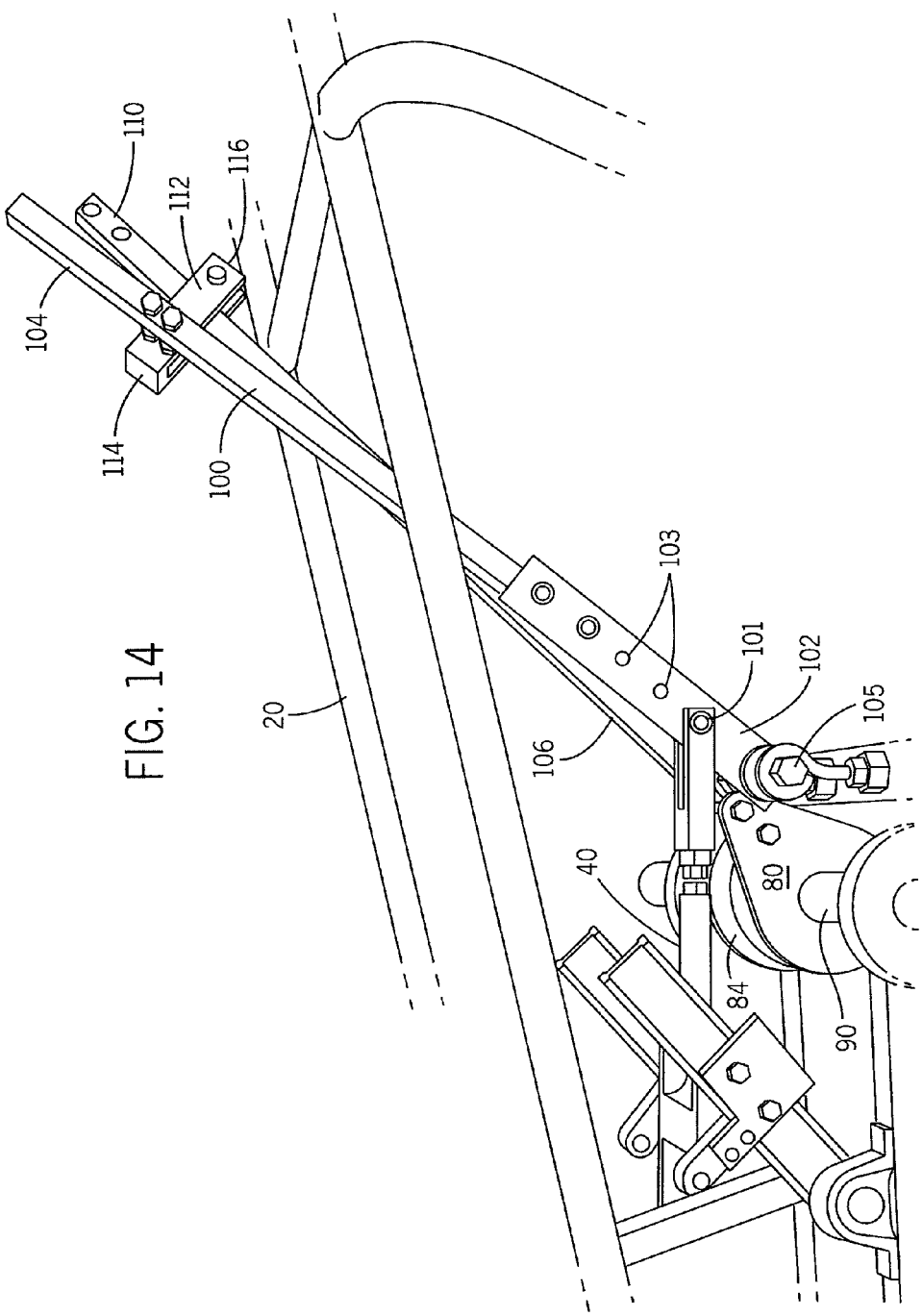
FIG. 14 is a partial right side view of the energy conversion system of FIG. 11.

Each push arm 40 is configured to compress, hold, and release a coil spring 38 positioned between a compression plate 42 and a rigid surface 39. In a preferred embodiment, the compression plate 42 is connected to a first end 44 of the push arm 40. The upper surface 46 of the push arm 40 includes at least one and preferably multiple cavities 48. Each cavity 48 includes a sloped portion 50 beginning at the edge of the cavity 48 most distant from the coil spring 38 and extending downwards to the bottom of the cavity 48. Each cavity also includes a rear wall 52 positioned at the edge of the cavity 48 nearest the coil spring 38 and extending from the bottom of the cavity 48 to the upper surface 46. Each cavity 48 is configured to engage a holding arm 60. A crossbar 54 is connected to a lower surface 56 of the push arm 40. The crossbar 54 is connected generally perpendicular to the push arm 40 and extends beyond each side of the push arm 40 far enough such that the end may be engaged to compress the coil spring 38. The crossbar 54 may be directly engaged by the second end 32 of the lever 28 seated against the crossbar 54 while the coil spring 38. Referring also to FIGS. 11-12, the crossbar 54 may optionally be engaged by a compression lever 55, which is, in turn, engaged by a bracket 57 mounted near the second end 32 of lever 28. The bracket 57 preferably extends perpendicularly to the lever 28 and may slidably engage the compression lever 55. Optionally, rollers 53 may be mounted to the bracket 57 to engage the compression lever 55.

The second end 58 of the push arm 40 engages the drive portion of an overrunning clutch 84. Referring again to FIGS. 1-10, the push arm 40 may be pivotally connected to and directly drive a transfer member 80. The transfer member 80 is, in turn, connected to an overrunning clutch 84. In one embodiment, the transfer member 80 is generally ovoid in shape and has a hole 82 extending through the round portion of the transfer member 80. The hole 82 in the transfer member fits over the output shaft 90 and the transfer member 80 is connected to the drive portion of the overrunning clutch 84. The narrow end of the transfer member 80 is pivotally connected to the second end 58 of the push arm 40. The driven portion of the overrunning clutch 84 is connected the output shaft 90.

Referring next to FIGS. 11-14, the push arm 40 may be coupled to the transfer member 80 via a drive bar 100 and return bar 106. The second end 58 of the push arm 40 is directly coupled near a first end 102 of a drive bar 100. The first end 102 of the drive bar 100 is pivotally connected to the frame 20 at a fulcrum 105 and preferably includes multiple holes 103 spaced apart and extending from the first end 102 along a portion of the length of the drive bar 100 to variably position the second end 58 of the push arm 40 along the drive bar 100. A securing member 101, such as a bolt or pin, is inserted through a pair of holes on the second end 58 of the push arm 40 and one of the holes 103 on the drive bar 100. Each hole 103 corresponds to a different stroke length of the spring compression system 11. The second end 104 of the drive bar 100 is rigidly connected to a linkage 112. The linkage 112 is rigidly connected to the drive bar 100 at a first end 114 of the linkage 112 and includes an opening, or channel, at the second end 116 of the linkage 112 to receive a return bar 106. The opening is at least partly defined by the body of the linkage 112. A first end 108 of the return bar 106 is coupled to the transfer member 80 and a second end 116 of the return bar 106 slidably engages the opening in the linkage 112.

The energy conversion system 10 includes a spring holding system 59. The spring holding system 59 preferably includes a holding arm 60, a cable 71, and a holding arm control lever 77. The holding arm 60 is configured to selectively engage the push arm 40. A first end 62 of the holding arm 60 is configured to move along the upper surface 46 of the push arm, for example by sliding or rolling. In one embodiment, the first end 62 of the holding arm 60 has a roller means connected and is configured to roll along the upper surface 46 of the push arm 40. The roller means includes a cutout 64 extending from the first end 62, along a portion of the length, and between the two sides of the holding arm 60. A pair of holes 66 extends through each of the sides of the holding arm 60 within the cutout 64. A rod 68 is inserted through the pair of holes 66 and is configured to hold at least one, and preferably multiple rollers 70. The rollers 70 may be positioned either within the cutout 64, on the outside of the sides of the holding arm 60, or in both positions. The overall width of the rollers 70 is less than the width of the cavities 48 in the push arm 40 such that the holding arm 60 may roll along the upper surface 46 of the push arm 40 and drop down the wall 52 of each cavity 48 by gravity. The holding arm 60 may continue rolling up the sloped portion 50 of the cavity. The holding arm 60 additionally has a cable 71 connected to the upper end of the arm 60. The cable 71 extends over a series of pulleys 76 configured to route the cable 71 to a position near the seat 19 of the operator. The cable 71 is connected to a holding arm control lever 77 that is pivotally connected to the frame 20 near the seat 19.

Figure 8:
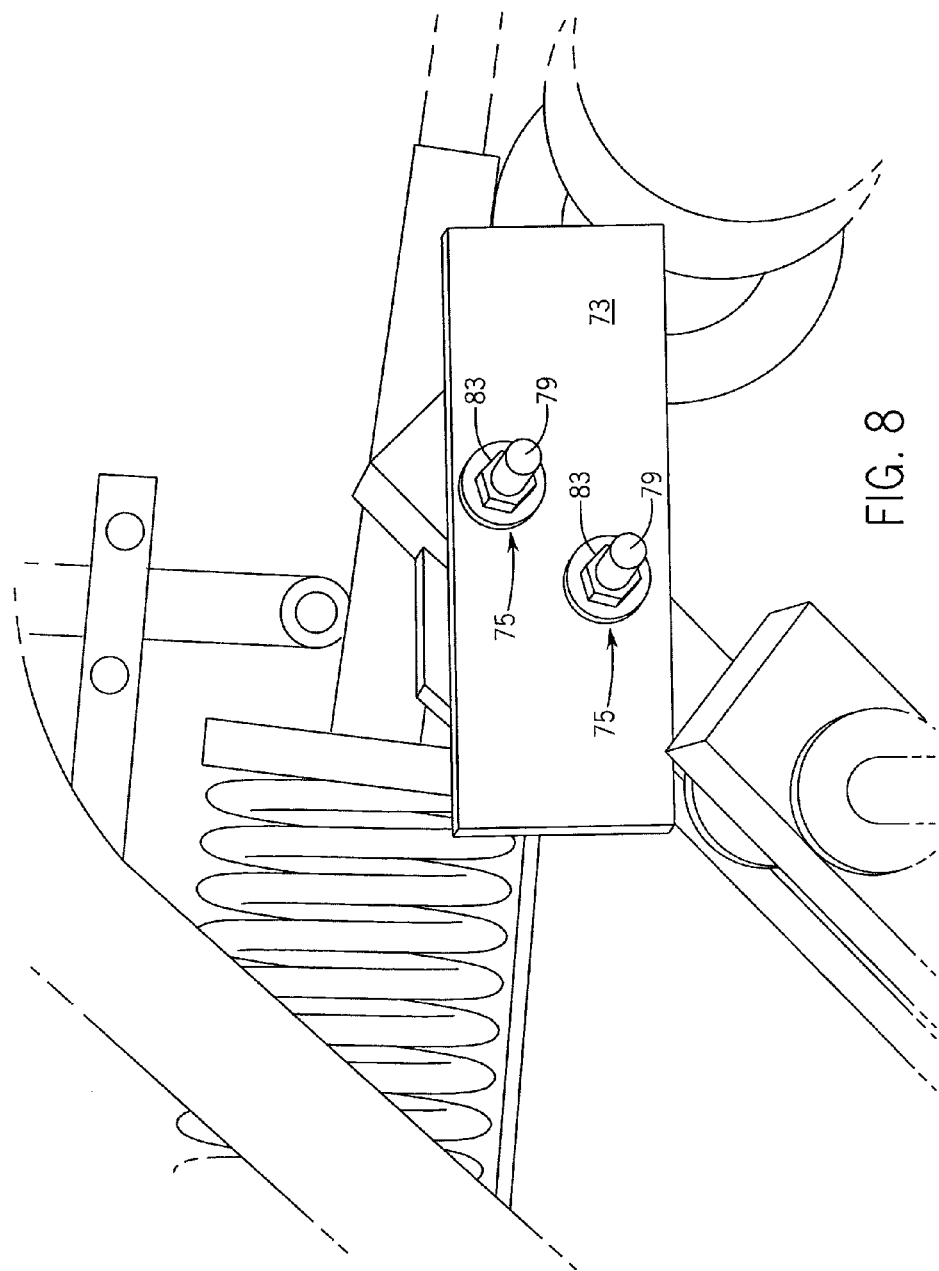
FIG. 8 is a partial perspective view of the energy conversion system of FIG. 4.
Figure 9:
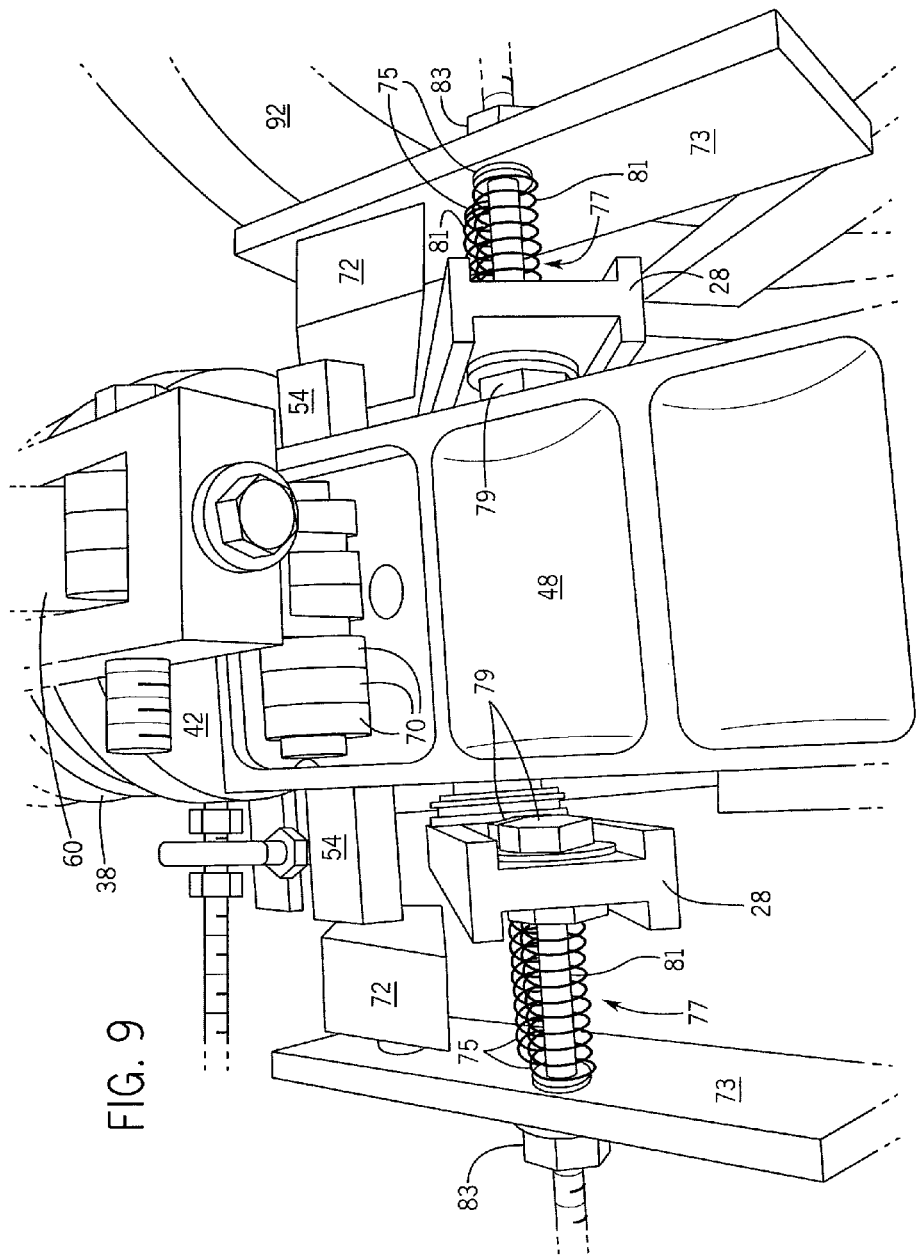
FIG. 9 is a partial perspective of the energy conversion system of FIG. 4.
Figure 10:
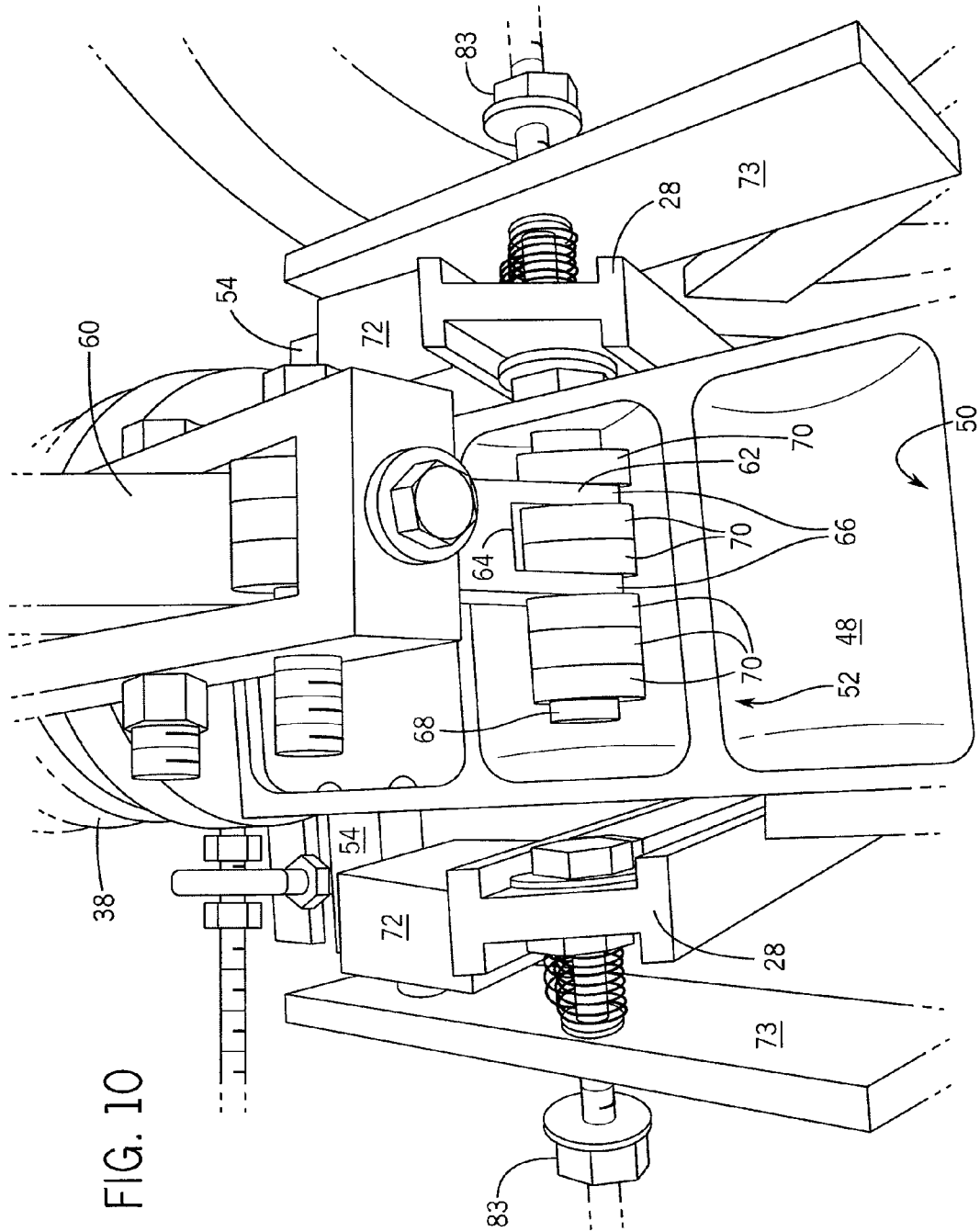
FIG. 10 is a partial perspective of the energy conversion system of FIG. 4.

Referring again to FIGS. 1-10, a system for compressing the coil spring 38 in stages may be included. At least one, and preferably a pair, of spacer blocks 72 are connected proximate to the second end 32 of the lever 28. Each spacer block 72 is connected to a mounting plate 73 located on the outer side of the lever 28. The mounting plate 73 has at least one aperture 75 extending through the mounting plate 73. As shown in FIGS. 8-10, the mounting plate preferably includes a pair of apertures 75. The mounting plate 73 is connected to the lever 28 by a spring fitting 77. In FIGS. 8-10, for example, the spring fitting 77 includes two bolts 79, each bolt 79 passing through the lever 28 and through one of the apertures 75. A spring 81 fits over each bolt 79 and is positioned between the lever 28 and the mounting plate 73. A nut 83 holds the plate on the bolt 79 and against the spring 81. The spring 81 biases the mounting plate away from the lever 28. A cable 74 is connected to each mounting plate 73 and extends over a series of pulleys 76 configured to route the cable 74 to a position near the seat 19 of the operator. The cable 74 is connected to a spacer block control lever 78 that is pivotally connected to the frame 20 near the seat 19. The spacer block control lever 78 may be rotated from a first position to a second position such that it pulls the cable 74 which, in turn, causes the mounting plates 73 to compress the springs 81 and move the mounting plates 73 and spacer blocks 72 towards the lever 28.

The energy conversion system 10 may also include a flywheel 92 connected to the output shaft 90. The flywheel 92 includes a central hub that may be slid onto the output shaft 90. The flywheel 92 may be directly coupled to the output shaft 90 or, optionally, any mating hardware as would be known to one skilled in the art may be used to mount the flywheel 92 to the output shaft 90. The flywheel 92 may be of any construction, for example a solid wheel or a spoked wheel, that has sufficient mass to store the energy delivered from the coil spring 38. It is well known that energy is stored in a flywheel according to equation (1), below. Consequently, the mass of the flywheel 92 may be selected such that it rotates at an acceptable speed according to the energy delivered by the coil spring 38.

$$E = \frac{1}{2} \cdot I \cdot \omega^2 \quad (1)$$

where I is the moment of inertia, and
ω is the angular velocity.

In operation, an operator applies force against the plate 12 with a foot until the operator's leg is extended. This force applied to the plate 12 causes the plate 12 to travel in a generally linear motion. The transfer bar 22 similarly travels in a generally linear motion and pulls the first end 30 of the lever 28 towards the operator. The lever 28 pivots about the fulcrum 34 and the second end 32 of the lever 28 engages a crossbar 54 on a push arm 40 which is used to compress the coil spring 38.

Referring to FIGS. 1-10, the second end 32 of the lever 28 directly engages the crossbar 54. The force of the lever 28 against the crossbar 54 causes the push arm 40 to travel a first distance toward and compress the coil spring 38 with the compression plate 42. The second end 58 of the push arm 40 is connected to the transfer member 80. The movement of the push arm 40 causes the transfer member 80, and the overrunning clutch 84 to which it is connected, to be drawn back the same distance as the coil spring 38 is compressed. The mounting location of the fulcrum 34 is selected such that the coil spring 38 compresses about two inches each time the operator compresses the plate 12. It is contemplated that the length of compression on the spring 38 may be varied according to, but not limited to, the force required to compress the spring 38 and the available travel in the spring 38.

Referring to FIGS. 11-14, the push arm 40 may indirectly engage the crossbar 54. As the second end 32 of the lever 28 pivots about the fulcrum 34, the bracket 57 engages a compression lever 55. The bracket slides up, or, if rollers 53 are included, rolls up the front surface of the compression lever 55 while also pressing the compression lever 55 rearward. The rear surface of the compression lever 55 engages the crossbar 54. Similar to the embodiment described above, the crossbar 54 causes the push arm 40 to travel a first distance toward and compress the coil spring 38 with the compression plate 42. The second end 58 of the push arm 40 is connected to and rotates the drive rod 100 rearward about fulcrum 105.

After the push arm 40 has traveled the first distance, the holding arm 60 drops into one of the cavities 48 on the push arm 40, preventing the coil spring 38 from returning to the uncompressed position. The operator then releases the plates 12, causing the transfer bar 22 and lever 28 to return to their original position.

The push arm 40 may include multiple cavities 48 to allow greater compression of the coil spring 38. If so equipped, as illustrated in FIGS. 8-10, the operator may pull the spacer block control lever 78 from a first position to a second position. The spacer block control lever 78 pulls the cable 74 which in turn causes the mounting plates 73 to compress the springs 81 and move the mounting plates 73 and spacer blocks 72 towards the lever 28. The spacer blocks 72 are positioned such that each block 72 moves into the space between the second end 32 of the lever 28 and the crossbar 54. The space forms because the push arm 40 is retained in a compressed state when the lever 28 returns to the original position. The operator again applies force to the plates 12, repeating the above-described cycle to cause the push arm 40 to compress the spring a second time. During this second cycle, the spacer blocks 72, connected to the lever 28, apply force to the crossbar 54. The holding arm 60 slides up the sloped portion 50 of the first cavity 48 and drops into the next cavity 48. The holding arm 60 again retains the spring in a compressed state. Preferably, the push arm 40 includes two cavities 48 and two compressed positions. It is contemplated that any number of cavities and compressed positions may be used according to, but not limited to, the length of travel of the spring 38 and the force required to compress the spring 38.

While the operator is applying force to the plates 12 the second time, the operator may push the spacer block control lever 78 back to a first position. Optionally, the control lever 78 may be spring-biased to return to the first position by the operator releasing the lever 78. The spacer blocks 72 are held in place against the crossbar 54 by the force the operator applies to the spring compression system 11. The plates 12 are again released by the operator and return to their original position. When the operator releases the plates 12 and the lever arm 28 returns to its original position, the spacer blocks 72 are no longer held against the cross bar 54 and each spring 81 forces the respective mounting plate 73 back to its first position such that the spacer blocks 72 are again outside of the crossbar 54 and the lever 28.

After the lever arm 28 has returned to its original position such that it is clear of the coil spring 38, the holding arm 60 may be released to allow the spring to uncompress. The operator pulls a holding arm control lever 77 from a first position to a second position. The holding arm control lever 77 pulls the cable 71 which lifts the holding arm 60, and disengages the holding arm 60 from the push arm 40. Once the holding arm 60 has cleared the push arm 40, the coil spring 38 quickly returns to its uncompressed state, forcing the push arm 40 to return to its original position.

Referring to FIGS. 1-10, as the push arm 40 is driven forward, it causes the transfer member 80 to rotate forward about the output shaft 90 and to drive the overrunning clutch 84 forward. The force of the coil spring 38 returning to its uncompressed state causes this push arm 40 and transfer member 80 to return to their original position at a high rate of speed. The resulting rotation of the transfer member 80 and the driven portion of the overrunning clutch 84 is generally faster than the speed at which the output shaft 90 is rotating. Consequently, the overrunning clutch 84 accelerates the output shaft 90. The action of the overrunning clutch 84 converts the energy from the spring 38 into rotational kinetic energy in the output shaft 90.

Referring to FIGS. 11-14, as the drive bar 100 is rotated rearward, the linkage 112 is similarly drawn rearward. However, the return bar 106, being offset from and connected to a different pivot axis than the drive arm 106, rotates along an arcuate path different than the arcuate path of the drive bar 100. Consequently, the second end 110 of return bar 106 is free to move within the opening of the linkage 112. As the linkage 112 is drawn rearward, the second end 110 of the return bar 106 slides along but remains in the opening of the linkage 112. Consequently, the linkage 112 draws the return bar 106 rearward as well. As the return bar 106 is drawn rearward, the first end 108 of the return bar 106, which is coupled to the transfer member 80, rotates the transfer member 80 and the driving portion of the overrunning clutch 84 rearward.

When the holding arm 60 is released the coil spring 38 returns to its uncompressed state, driving the push arm 40 forward. The drive bar 100 and linkage 112 are similarly rotated forward. As the linkage 112 is driven forward, the second end 110 of the return bar 106 again slides along but remains in the opening of the linkage 112. Consequently, the linkage 112 drives the return bar 106 forward as well. The force of the coil spring 38 returning to its uncompressed state causes the drive bar 100 and return bar 106 to rotate forward to their original positions at a high rate of speed. The first end 108 of the return bar 106, which is coupled to the transfer member 80, rotates the transfer member 80 and the driving portion of the overrunning clutch 84 forward at a high rate of speed as well. The resulting rotation of the transfer member 80 and the driven portion of the overrunning clutch 84 is generally faster than the speed at which the output shaft 90 is rotating. Consequently, the overrunning clutch 84 accelerates the output shaft 90, converting the energy from the spring 38 into rotational kinetic energy in the output shaft 90.

Referring again to FIGS. 1-10, if the energy conversion system includes a flywheel 92, the kinetic energy in the flywheel 92 may be used to drive external devices. The flywheel 92 continues rotating because the overrunning clutch 84 disengages from the output shaft 90 when the output shaft 90 rotates faster than the transfer member 80, which is either at rest or rotating backwards to again compress the spring 38. The operator may now repeat the cycle of compressing the spring 38, releasing the holding arm 60, and driving the flywheel 92 to maintain rotation on the flywheel 92 and the output shaft 90. The output shaft 90 may then be connected to an external device, such as a human-powered vehicle, to drive the external device.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept. For example, the spring coil 38 may have different spring constants, lengths, diameters, and coil thicknesses. The flywheel 92 may have different masses, diameters, thicknesses, and speeds. In addition, other energy storage or transfer mechanisms may be used in place of the spring such as a pneumatic or hydraulic pump and fluid storage system.

Moreover, the individual components need not be formed in the disclosed shapes, or assembled in the disclosed configuration, but could be provided in virtually any shape, so as to convert linear kinetic energy to rotational kinetic energy. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

I claim:

1. An energy conversion system, comprising:
    a frame;
    a spring compression system, further comprising:
        a plate operably mounted to the frame for receiving a generally linear force to move between a retracted position and an extended position,
        a transfer bar having a first end and a second end, the first end of the transfer bar connected to the plate and movable between the retracted position and the extended position, and
        a lever pivotally mounted to the frame and having a first end and a second end, the first end of the lever connected to the second end of the transfer bar;
    a push arm having a first end and a second end, the first end of the push arm is engaged by the second end of the lever;
    a coil spring having a first end and a second end, the first end of the coil spring engaged by the push arm, wherein the coil spring is compressed by the lever engaging the push arm when the plate is in the extended position;
    a transfer member including a first portion with an opening extending therethrough and a second portion extending away from the first portion, wherein the second end of the push arm engages the second portion of the transfer member;
    an over-running clutch having a driving portion and a driven portion, wherein the opening on the transfer member engages the driving portion; and
    an output shaft connected to the driven portion of the over-running clutch, wherein the over-running clutch engages the output shaft when the transfer member rotates faster than the output shaft and the clutch disengages the output shaft when the transfer member rotates slower than the output shaft.

2. The energy conversion system of claim 1 further comprising a second spring compression system, wherein the first end of the push arm is engaged by the second end of each of the levers.

3. The energy conversion system of claim 1 further comprising a flywheel mounted on the output shaft.

4. The energy conversion system of claim 1 wherein the push arm has an upper surface including one or more cavities and further comprising a holding arm operably connected to the frame to selectively engage the cavity on the upper surface of the push arm.

5. The energy conversion system of claim 4 wherein the push arm has at least two cavities and wherein the holding arm sequentially engages each of the two cavities on subsequent cycles of the plate between the retracted and extended positions.

6. The energy conversion system of claim 5 further comprising:
 a spacer block selectively positioned between a first position and a second position, wherein the spacer block is removed from a space defined between the second end of the lever and the first end of the push arm in the first position and the spacer block is within the space defined between the second end of the lever and the first end of the push arm in the second position.

7. The energy conversion system of claim 1 wherein the second end of the push arm is directly connected to the second portion of the transfer member.

8. The energy conversion system of claim 1 further comprising:
 a drive bar having a first end and a second end, the first end of the drive bar pivotally connected to the frame and the second end of the push arm is connected near the first end of the drive bar;
 a linkage rigidly connected proximate to the second end of the drive bar having an opening defined, at least in part, by the linkage; and
 a return bar having a first end and a second end, wherein the second end slidably engages the opening in the linkage and the first end is connected to the second portion of the transfer member.

9. The energy conversion system of claim 8 wherein the drive bar has a plurality of holes extending from the first end of the drive bar along a portion of the length of the drive bar and wherein the second end of the push arm is selectively connected to one of the holes.

10. The energy conversion system of claim 1 wherein the output shaft is connected to one of a wheel, a pump, and a generator.

11. An energy conversion system for converting linear kinetic energy into rotational kinetic energy, comprising:
 a frame;
 a spring compression system, further comprising:
  a plate operably mounted to the frame for receiving a generally linear force to move between a retracted position and an extended position,
  a transfer bar having a first end and a second end, the first end of the transfer bar connected to the plate and movable between the retracted position and the extended position, and
  a lever pivotally mounted to the frame and having a first end and a second end, the first end of the lever connected to the second end of the transfer bar;
 a coil spring having a first end and a second end, the second end of the coil spring rigidly connected to the frame;
 a compression plate having a first surface mounted to the first end of the coil spring, wherein the compression plate is engaged by the second end of the lever to apply a compressing force against the coil spring when the plate travels from the retracted to the extended position;
 a push arm having a first end and a second end, the first end of the push arm is connected to the compression plate;
 a drive bar having a first end and a second end, the first end of the drive bar pivotally connected to the frame and having a plurality of holes extending from the first end of the drive bar along a portion of the length, wherein the second end of the push arm is selectively connected to one of the holes;
 a linkage connected proximate the second end of the drive bar having a channel formed along one side of the linkage;
 a return bar having a first end and a second end, wherein the second end slidably engages the channel in the linkage;
 a transfer member including a first portion with an opening extending therethrough and a second portion extending away from the first portion, wherein the second portion of the transfer member is connected to the first end of the return bar;
 an over-running clutch having a driving portion and a driven portion, wherein the opening on the transfer member engages the driving portion; and
 an output shaft connected to the driven portion of the over-running clutch, wherein the over-running clutch engages the output shaft when the transfer member rotates faster than the output shaft and the clutch disengages the output shaft when the transfer member rotates slower than the output shaft.

12. The energy conversion system of claim 11 wherein the push arm has an upper surface including one or more cavities and further comprising a holding arm operably connected to the frame to selectively engage the cavity on the upper surface of the push arm.

* * * * *